(12) United States Patent
Westlund

(10) Patent No.: US 6,762,694 B2
(45) Date of Patent: Jul. 13, 2004

(54) CENTERLINE IDENTIFICATION IN A DOCKING GUIDANCE SYSTEM

(75) Inventor: Jan Westlund, Enskede (SE)

(73) Assignee: Safegate International AB, Malmo (SE)

( * ) Notice: Subject to any disclaimer, the term of this patent is extended or adjusted under 35 U.S.C. 154(b) by 0 days.

(21) Appl. No.: 10/320,740

(22) Filed: Dec. 17, 2002

(65) Prior Publication Data

US 2003/0160709 A1 Aug. 28, 2003

(30) Foreign Application Priority Data

Dec. 20, 2001 (EP) .............................. 01130258

(51) Int. Cl.⁷ .............................................. G08B 21/00
(52) U.S. Cl. .................... 340/958; 244/114 R; 382/104
(58) Field of Search ....................... 340/958; 244/114 R; 701/120; 702/104; 382/151; 356/3.14, 4.01

(56) References Cited

U.S. PATENT DOCUMENTS 5,675,661 A   10/1997  Richman et al. ............ 382/104
6,023,665 A   2/2000   Millgård ..................... 702/151
6,100,964 A   8/2000   De Cremiers ............ 356/4.011
6,324,489 B1  11/2001  Millgård ..................... 702/151
6,542,086 B2 * 4/2003  Baumgartner et al. ...... 340/958
6,597,818 B2 * 7/2003  Kumar et al. ............... 382/294

FOREIGN PATENT DOCUMENTS

EP   0 148 284 A1   7/1985
EP   0 880 122 A1   11/1998
WO   96/12265       4/1996
WO   96/20465       7/1996

* cited by examiner

Primary Examiner—Brent A. Swarthout
(74) Attorney, Agent, or Firm—Blank Rome, LLP

(57) ABSTRACT

The present invention achieves an accurate and quick centerline identification in a docking guidance system and further a verification of a centerline configuration. Heretofore, it is proposed to scan (S1) an apron in front of a docking stand (16) with a range finder (22) and to register a reflection intensity and position for each scanned point. Then, a centerline (14) is identified (S2) in front of the docking stand (16) by using differences in reflection intensity between the centerline (14) and the apron surface surrounding the centerline (14). Further, at least two centerline definition points (38, 40) are defined (S3) in compliance with the centerline layout.

16 Claims, 9 Drawing Sheets

CENTERLINE IDENTIFICATION IN A DOCKING GUIDANCE SYSTEM

FIELD OF INVENTION

The present invention relates to a centreline identification in a docking guidance system, and in particular to a centreline configuration in a docking guidance system which allows for a quick adequate handling of the centreline configuration.

BACKGROUND ART

Recently, there may be observed a significant increase in the amount of air traffic including take-offs, landings and other aircraft ground traffic. Further, also an increased number of ground support vehicles are required to handle cargo, passengers, and to provide catering services as well as maintenance and support of aircraft at airports. With this substantial increase in ground traffic, there arises a need of greater control and safety in the docking and identification of aircraft on an airfield. Heretofore, visual docking guidance systems, also referred to as VDGS systems, are used to achieve a safe and precise guidance during the docking of aircraft to the related aircraft stand. Important to note that the information that the airplane pilot receives from the visual docking guidance system must be so accurate that the aircraft is guided to a correct stop position with least possible risk of colliding with an obstacle on the apron.

FIG. 1 shows a typical environment for the application of such docking guidance systems. Typically, an aircraft 10 approaches a terminal building 12 which is located adjacent to the airfield. For a precise guidance of the aircraft 10 to an aircraft stand 16—which may also be located out on the apron when passengers are transported by bus—there is provided a centreline 14. This centreline 14 comprises painted stop positions 18 for the different aircraft types the aircraft stand 16 is intended for, and sometimes a painted stand ID. Alternatively, the stand ID may be given on a sign placed on a wall of a terminal building. In the vicinity of the aircraft stand, there is provided a tracking system 22 that operatively displays guidance information at a display 24 to the pilot of the aircraft 10.

In more detail, the tracking system 22 shown in FIG. 1 provides a location of the aircraft 10, a verification of the identity of the aircraft and a tracking of the aircraft to the aircraft stand 16. As soon as the aircraft 10 has landed on the airfield, the tracking system 22 is informed by a control tower 28 that an aircraft is approaching the aircraft stand 16 and also which type of aircraft (e.g., B747) is expected.

The tracking system 22 then continuously scans the apron in front of the aircraft stand 16, until it locates the aircraft 10 and verifies that the type is the correct one. Subsequently, the tracking system 22 tracks the aircraft 10 to the stop position 18 and also the lateral position with respect to the centreline 14 to the pilot of the aircraft 10.

The distance and the lateral position are displayed at the display 24 allowing the pilot of the aircraft to correct the position of the aircraft while approaching the aircraft stand 16.

Once the aircraft 10 has reached its stop position 18, this is also indicated on the display 24 so that the pilot may stop the aircraft. Once the aircraft 10 comes to a rest, it is therefore accurately aligned with the aircraft stand 16 with minimum requirement of an adjustment of stand facilities relative to the aircraft by ground staff.

Typically, the centreline 14 shown in FIG. 1 is a yellow line painted on the apron leading to the aircraft stand 16. The centreline 14 is laid out such that the risk of collision during manoeuvring of the aircraft 10 is minimized. As the pilot of the aircraft 10 has a limited field of view, he may not see the centreline 14 during the approach of the aircraft 10 to the stop position 18. He may therefore be completely dependent on the guidance given by the visual docking guidance system. For this reason the accuracy with which the visual docking guidance system may guide the aircraft 10 along the centreline 14 is safety critical.

When the visual docking guidance system 22, 24 is installed at the aircraft stand 16 parameters defining the location of the centreline 14 relative to the visual docking guidance system 22, 24 must be adjusted or, in other words, configured and/or calibrated for this particular aircraft stand 16.

The location of the centreline 14 is defined through angle and distance to so-called centreline definition points on the centreline 14 related to the position of the tracking system. These centreline definition points are defined by the operator of the visual docking guidance system to achieve a correct modelling of the layout, course and topology of the centreline.

When the centreline is straight it is sufficient to define two centreline definition points, i.e., well-separated points on the centreline 14. To the contrary, when the centreline 14 is curved, horizontally and/or vertically, it is necessary to define a plurality of centreline definition points.

FIG. 2 shows in more detail an approach to achieve this functionality through a calibration picture with distance indication using different grades of different colours for increased distance from the aircraft stand.

The example shown in FIG. 2 is related to a visual docking guidance system that is based, e.g., on a laser range finder generating a laser beam that is directed along different directions by a scanning mechanism in the visual docking guidance system.

Here, the position of each point in front of the visual docking guidance system is defined through two angles $\alpha$, $\beta$, the first angle $\alpha$ characterizing a vertical inclination towards a horizontal straight plane, the second angle $\beta$ being defined with respect to a vertical plane, e.g., running through the tracking system straight out on the apron. Further, a third value d characterizes the distance between the tracking system 22 and the point.

From the above it should be clear that the visual docking guidance system must be configured either after a new installation or after maintenance if there is a probability that the reference direction of the scanning mechanism has been effected. Further as the function of the visual docking guidance system 22, 24 is safety critical it is important that the configuration of the centreline is achieved with sufficient accuracy.

As shown in the lower part of FIG. 2, using such a representation of each scanned point on the apron with respect to the tracking system 22 of the visual guidance system there may be derived an echo picture—equivalently referred to as centerline identification picture or calibration picture in the following—reflecting the position of each scanned point with respect to the tracking system 22. This picture may be displayed on a computer screen, e.g., using different colours.

In particular, different distance ranges 28, 30, 32 in front of the aircraft stand 16 of the terminal are illustrated through, e.g., different colours or shades on a display used during configuration of the visual guidance system 22, 24. Therefore, a three-dimensional echo picture is created through scanning the area in front of the aircraft stand 16. In this echo picture the third dimension, i.e. the distances to objects or scanned points in front of the visual docking guidance system, are represented through different gray shades or different colours, as outlined above.

FIG. 3 shows the calibration picture according to FIG. 2 when a reflecting reference object 34 is placed in front of the aircraft stand on the apron.

As shown in FIG. 3, the reflecting object 34, typically a big plate, is placed at different points on the centreline 14 for definition of corresponding centreline definition points. Each placement of the reflecting object 34 is visually identified in the centreline identification picture as shown in FIG. 3, and the midpoint 36 fixed at the lower edge of the reference object 34 may be referred to for definition of centreline definition points. Measured angles and distance to this centreline definition point may be stored for subsequent reference thereto.

However, a problem with this method known in the art is that the borderline between the reference object, i.e., the plate, and the apron may be difficult to identify, e.g., when the apron is wet during severe weather conditions. A consequence of this is that the method may therefore be time-consuming.

Further, as the reference object typically is large, in the order of 1 m by 1 m, to be clearly visible in the calibration picture, there is a risk that the determined centreline definition point, i.e., the midpoint 36 at the lower edge of the reference object, does not lie on the actual borderline between the reference object and the centreline 14, but is lying higher up on the reference object.

Therefore, an error is introduced at the very beginning of the configuration into the stored angles and distance to the visual docking guidance system for each centreline definition point. Clearly, this directly affects the accuracy of the guidance achieved by the visual docking guidance system.

Yet another difficulty with the known method is that with large reference objects during windy conditions, special arrangements or extra maintenance staff is required to keep the reference object in position during configuration of the visual docking guidance system.

SUMMARY OF INVENTION

In view of the above, the object of the present invention is to achieve a quick, adequate centreline identification in a docking guidance system.

Yet another object of the invention is to achieve a quick and accurate configuration check for an already identified centreline.

According to a first aspect of the present invention, this object is achieved through a method of centreline identification in a docking guidance system, comprising the steps of scanning an apron in front of an aircraft or docking stand with a range finder and registering reflection intensity and position for each scanned point and identifying a centreline in front of the docking stand by using differences in reflection intensity between the centreline and the apron surface surrounding the centreline.

Therefore, according to the present invention it is proposed to use reflectivity properties of the centreline—e.g., painted in colour on the apron—and the surrounding surface on the apron in addition to angles and distance to different scanned points, in particular, of centreline definition points selected for the definition of the centreline in the visual docking guidance system.

In other words, according to the present invention, a three-dimensional picture of the apron in front of the visual docking guidance system is created, where reflection intensity, or more precisely the amplitude of echoes or equivalently the amount of reflected beam energy from the scanned points or reflecting objects constitutes the third dimension that may be displayed, e.g., in shades or colours. Therefore, either a scanned point on the apron or a reflecting object may be identified in the calibration picture even if the difference in distance between the scanned objects and the apron floor is small or even zero, provided the difference in reflection properties between this point or object and the surrounding surface is significant.

According to a preferred embodiment of the present invention the method of centreline identification comprises a further step of defining at least two centreline definition points in compliance with the centreline layout.

According to this preferred embodiment of the present invention, it is possible to avoid the use of large reflecting objects, e.g., the reflecting plate referred to above with respect to FIG. 3, when the yellow centreline itself is discernable in the calibration picture. In this case, centreline definition points may be defined through selection of points lying on the centreline. Then the related vertical and horizontal angles and distance may be stored for subsequent reference thereto.

According to another preferred embodiment of the present invention the method of centreline identification comprises a further step of comparing pre-defined centreline definition points with the centreline layout.

According to this preferred embodiment of the present invention, it is proposed to generate a centreline identification picture not only after installation of the docking guidance system, but also during subsequent operating periods thereof, e.g., for verification of an already existing centreline configuration after a predetermined time interval of operation or after maintenance of the visual docking guidance system.

This verification is achieved through simply regenerating a centreline identification picture, e.g., on a display screen, and subsequent superposition of centreline definition points previously generated through a preceding centreline configuration. I.e., pre-stored centreline definition points are superimposed onto the newly generated centreline identification picture and when they perfectly fit to the newly identified centreline, the conclusion is that the centreline configuration is exact.

Otherwise, i.e., when the pre-stored centreline definition points in the newly generated picture are located to the side of the identified centreline or when the distance to a point in the picture, indicated by a superimposed definition point, is different from the stored distance, a new configuration of the visual docking guidance system becomes necessary.

According to another preferred embodiment of the present invention it is proposed that the identification of the centreline in front of the docking stand is achieved automatically on the basis differences in reflection intensity between the centreline and the apron surface surrounding the centreline.

This preferred embodiment of the present invention is particularly suited for cases where the centreline is painted in high-intensity colours on the apron, e.g., in yellow colours, as is usually the case. In this case, the identification of the centreline may be achieved automatically using well-known pattern recognition techniques with respect to the centreline identification picture.

According to yet another preferred embodiment of the present invention it is proposed, in case the centreline is not discernable, to place at least two reflecting objects with high reflectivity on the centreline before scanning of the apron.

Here, high reflectivity means a reflectivity being higher than the reflectivity of the surface surrounding the centreline. Due to the fact that such highly reflecting objects may be detected with high accuracy, more or less independently of their size, when using the echo amplitude they may be much smaller than previously used reflecting objects referred to above.

Further, as these small reflecting objects stand out from the surrounding apron due to the high reflectivity, again the small surface thereof avoids the problems mentioned above regarding the plates used in the known method, e.g., the problems regarding the accuracy of configuration or the handling of windy conditions.

Overall, the inventive method provides a faster and more accurate identification of centrelines and thus an accelerated configuration of a visual docking guidance system with improved accuracy, either with or without high reflecting reference objects. Due to the fact that the centreline may be more easily defined when using the reflectivity parameters as additional dimension during scanning of the apron the centreline identification picture may be more easily generated and processed in an automatic manner. For this reason the centreline identification and visual docking guidance system configuration may be carried out more often what again enhances the overall safety provided by the visual docking guidance system.

According to a second aspect of the present invention, the objects outlined above are also achieved through a centreline identification system for a docking guidance system comprising a scanning unit adapted to scan an apron in front of a docking stand, a registration unit adapted to register reflection intensity and position for each scanned point, and a processing unit adapted to identify a centreline in front of the docking stand by using differences in reflection intensity between the centreline and the apron surface surrounding the centreline.

According to a preferred embodiment of the inventive centreline identification system the processing unit is further adapted to define at least two centreline definition points in compliance with the centreline layout or to compare pre-defined centreline definition points with the centreline layout.

Therefore, the same advantages as outlined above with respect to the inventive method are also achieved by the inventive centreline identification system.

Still further, another advantage of the inventive centreline identification system is that it may easily be implemented using existing visual docking guidance system infrastructures without hardware modification simply through upgrade of the related processing unit, e.g., either in hardware or in software or a combination thereof.

According to another preferred embodiment of the present invention there is provided a computer program product directly loadable into the internal memory of a processing unit in a docking guidance system comprising software code portions for performing the steps according to the inventive method when the product is run on the processing unit in a docking guidance system.

Therefore, the present invention is also provided to achieve an implementation of the inventive method steps on computer or processor systems. In conclusion, such implementation leads to the provision of computer program products for use with a computer system or more specifically a processor comprised in, e.g., a visual docking guidance system.

The programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or telephone networks and/or internet via modems or other interface devices. It should be understood that such media, when carrying processor readable instructions implementing the inventive concept represent alternate embodiments of the present invention.

BRIEF DESCRIPTION OF DRAWING

In the following, the best mode of carrying out the present invention and related preferred embodiments thereof will be described with reference to the enclosed drawing in which.

BEST MODE AND PREFERRED EMBODIMENTS

Figure 1:
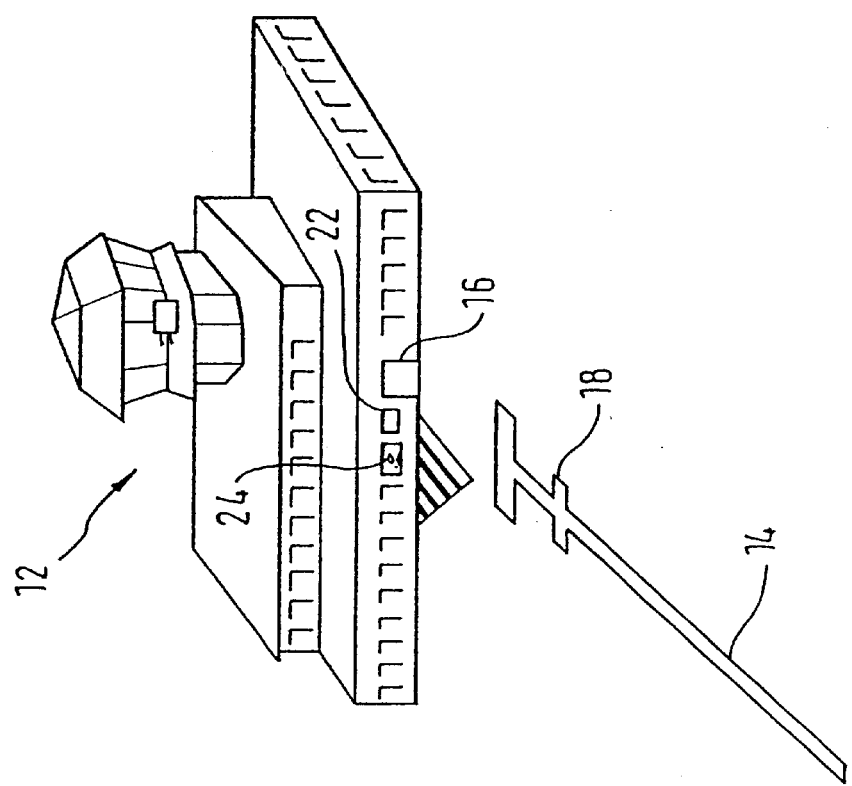
FIG. 1 shows a typical embodiment for the application of a docking guidance system.
Figure 2:
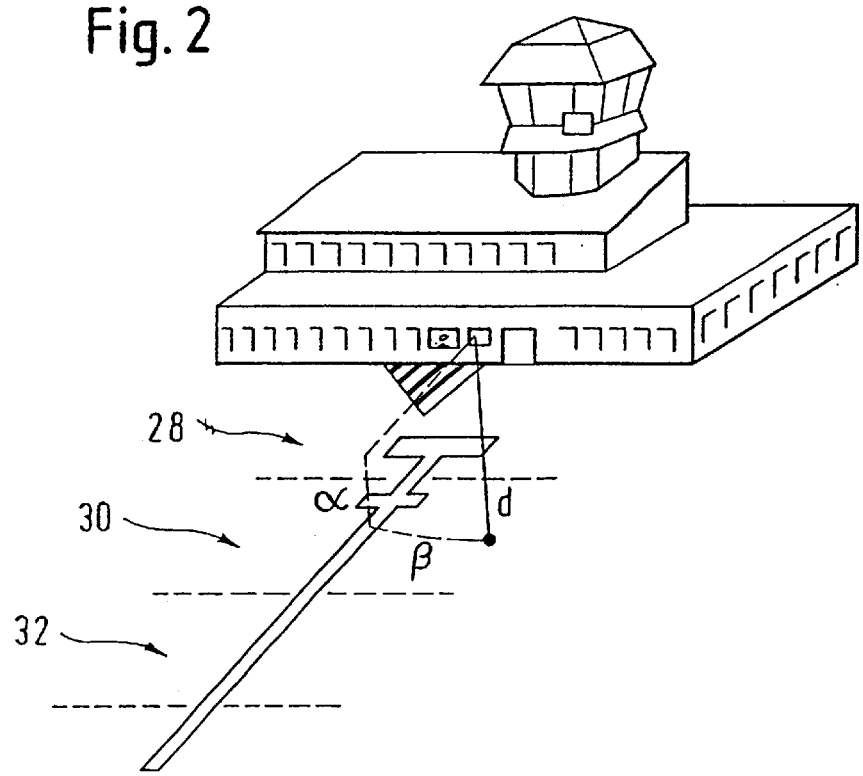
FIG. 2 shows a centerline identification picture with distance indication using different grades of grey or different colours for increasing distances from the aircraft stand shown in FIG. 1.
Figure 2:
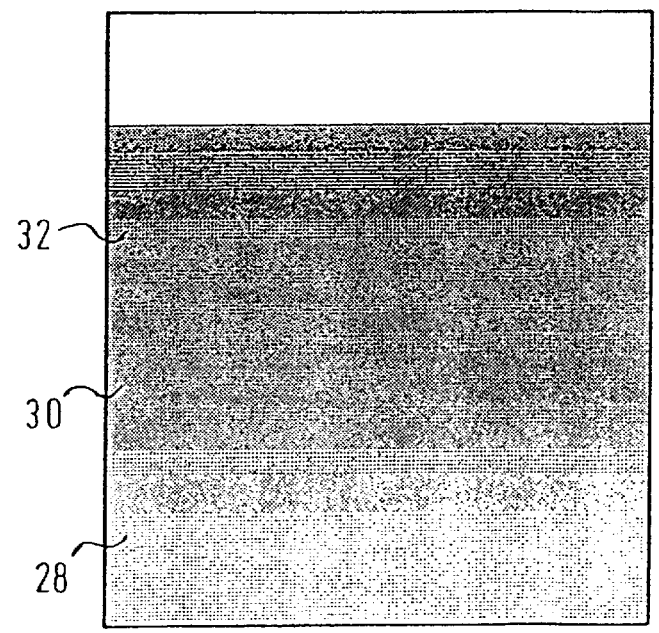
Figure 3:
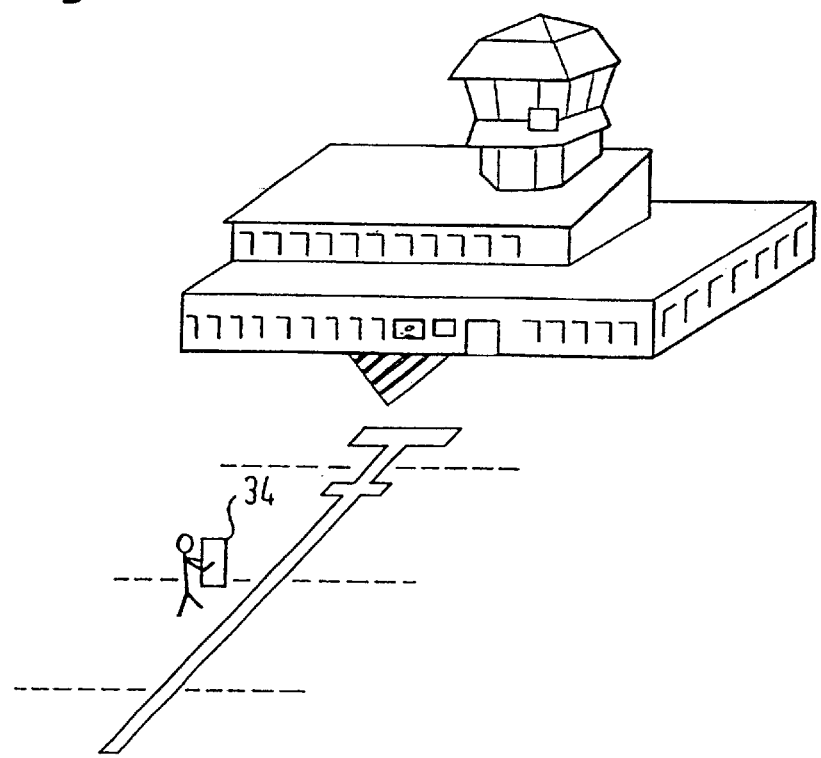
FIG. 3 shows a centerline identification picture according to FIG. 2 with a reflecting object being placed in front of the aircraft stand on the apron.
Figure 3:
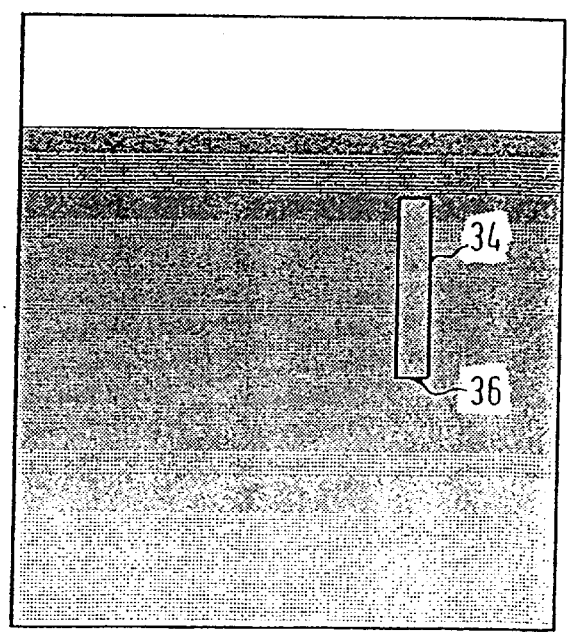

In the following, the best mode of carrying out the present invention and preferred embodiments thereof will be explained with reference to the drawing. Insofar as reference is made to the same parts and components as already referred to above with respect to FIGS. 1 to 3, the same reference numerals will be used and a repeated explanation thereof will be omitted.

Figure 4:
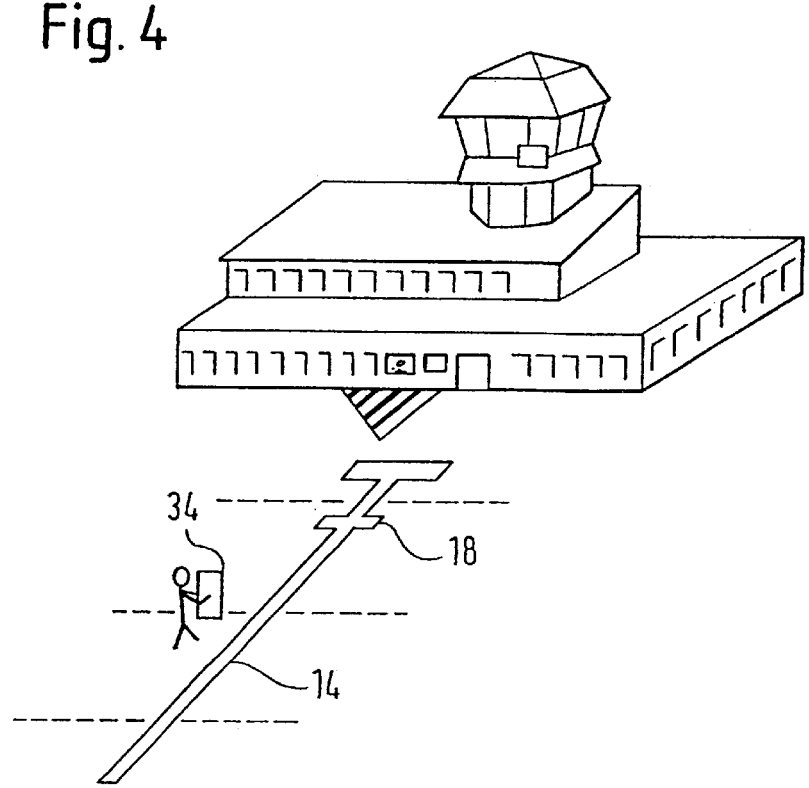
FIG. 4 shows a centerline identification picture with reflected intensity displayed according to the present invention.
Figure 4:
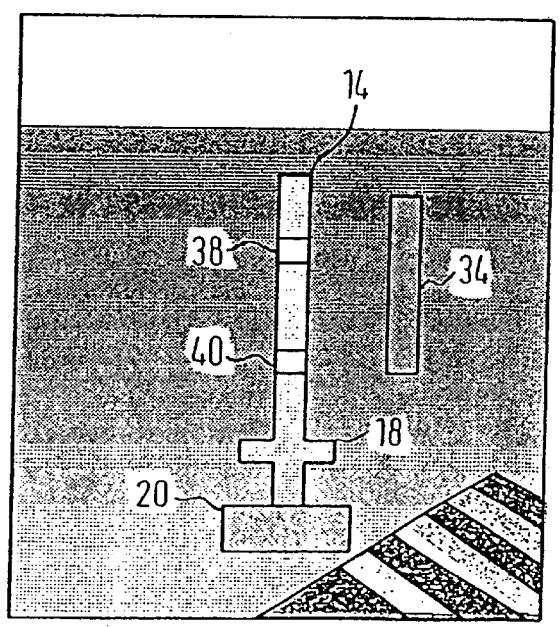

FIG. 4 shows a centerline identification picture with reflected intensity displayed according to the present invention.

The centerline identification picture displays the reflected intensity as a function of the horizontal and vertical scan angle. The higher the intensity, the lighter the shade of grey. While there is no distance information in the picture itself, the distance to a particular point may be found, e.g., by clicking with a cursor on this point at a computer display. The distance to this point may then be shown in a separate display window of the computer display.

As shown in FIG. 4, according to the present invention it is proposed not only to consider the vertical and horizontal angle together with a distance to a scanned point for generation of a centerline identification picture but also to measure the amplitude of echoes reflected to the visual docking guidance system 22, 24 as a further measurement dimension.

The result of this approach is shown in the lower part of FIG. 4. It can be seen that not only the reflecting object 34 is represented in the centreline identification picture, but also the centreline 14, the stop position 18, a stand ID 20 and also the no-go area in front of the aircraft stand 16.

From the lower part of FIG. 4, it may be seen that due to the use of amplitude information it is no longer necessary to use a large reflecting object 34 referred to above with respect to the prior art to configure the visual docking guidance system.

To the contrary, one may directly refer to display information having a 1:1 relationship to the centreline, stop position, ID stand, no-go area, etc., on the apron thus increasing accuracy of the measurement.

One possible approach is to mark at least two centreline definition points 38, 40, once the centreline identification picture is displayed on a screen, e.g., through use of an interactive input/output device, e.g., a mouse, a touch screen, a light pen, etc.

The position of these centreline definition points 38, 40 may then be stored and subsequently referred to when the centreline identification picture is regenerated at a later point of time for verification purposes. It is then possible to read out the centreline definition points 38, 40 and to superimpose these points onto the regenerated centreline identification picture.

Figure 5:
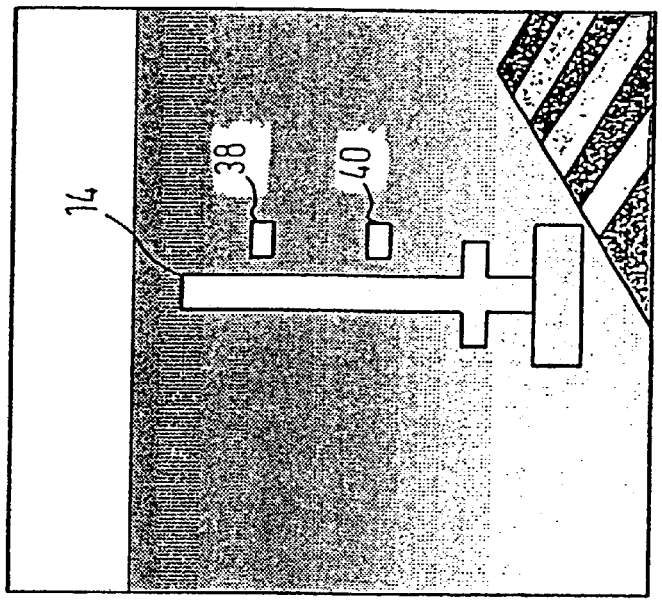
FIG. 5 shows an example for a centreline configuration definition and a centreline configuration verification according to the present invention.
Figure 5:
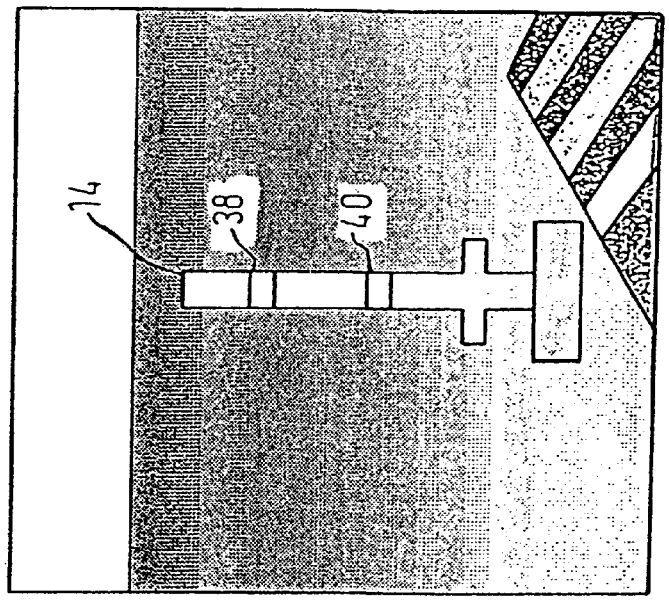

As shown in FIG. 5, left part, when there is a match in position of the pre-stored centreline definition points 38, 40 to the centreline 14, i.e., when the picture of the centerline passes through the pre-stored definition points 38, 40 and the measured distance at these points coincide with the pre-stored values, it is clear that the visual docking guidance system is still configured or calibrated.

Otherwise, as shown in the right part of FIG. 5, when a mismatch between the centreline definition points 38, 40 and the centreline 14 occurs, it is clear that the visual docking guidance system is no longer configured or calibrated, e.g., due to maintenance or any other modification of hardware/software components comprised therein.

Figure 6:
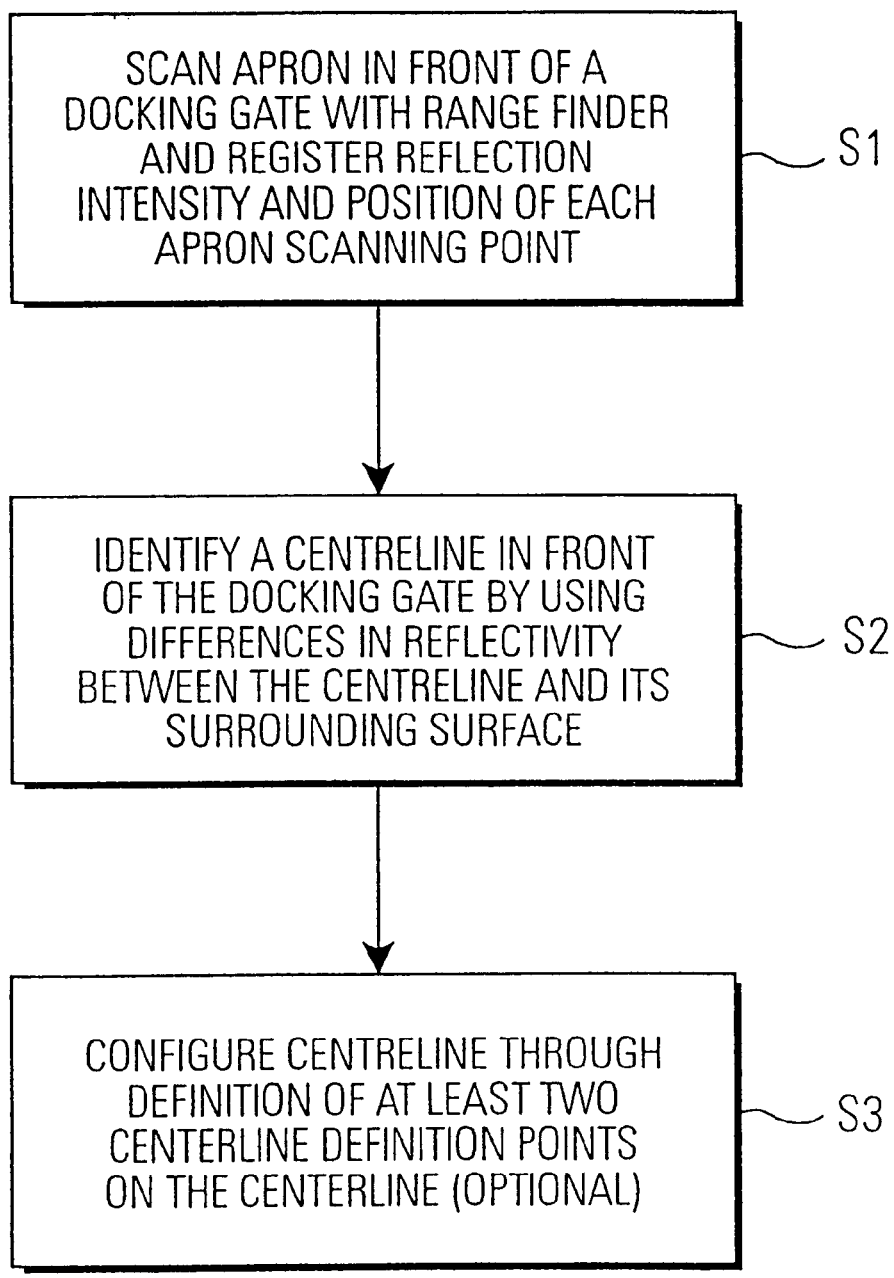
FIG. 6 shows a flowchart of the centerline identification method according to the present invention.

FIG. 6 summarizes the example given with respect to FIGS. 4 and 5 into a flowchart of the centreline identification method according to the present invention. In particular, this flowchart shows the first steps to be taken for a fast and adequate set of a visual docking guidance system.

As shown in FIG. 6, initially there is carried out a step S1 to scan the apron in front of the aircraft docking stand 16 with a range finder 22 and to register the reflection intensity and position for each scanned point. Then, a step S2 is carried out to identify the centreline 14 in front of the aircraft docking stand through a difference in reflectivity between the centreline 14 and its surrounding surface on the apron. Subsequently hereto, an step S3 (optional) is carried out to configure the centreline through definition of the at least two centreline definition points 38, 40 on the centreline 14.

Figure 7:
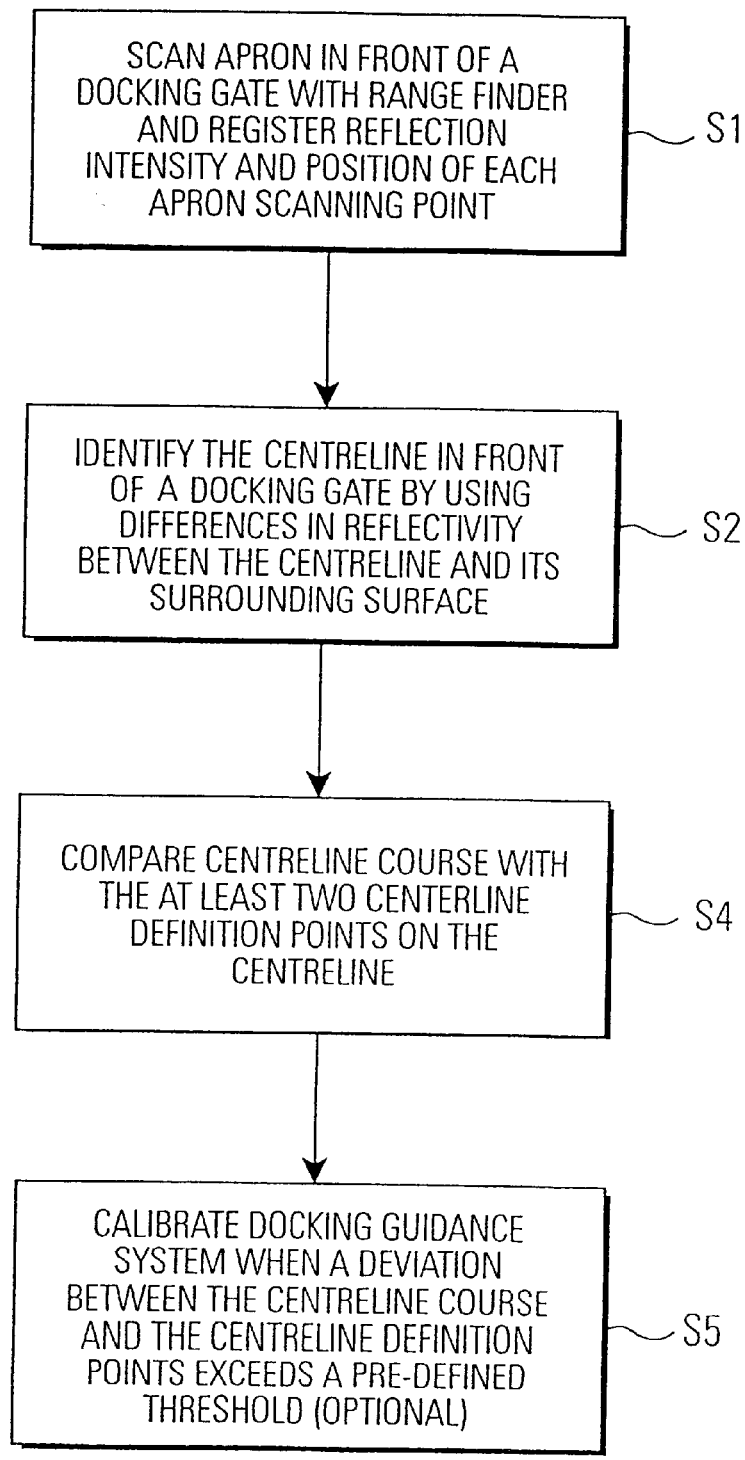
FIG. 7 shows a flowchart of the centreline configuration verification method according to the present invention.

FIG. 7 shows a flowchart of the centreline configuration verification method according to the present invention illustrated with respect to FIGS. 4 and 5. As step S1 and S2 of this method are identical to the initial configuration of the visual docking guidance system, no repeated explanation of these steps will be given.

As shown in FIG. 7, during a verification of a configuration a further step S4 is carried out to compare a centreline course displayed on a screen with the at least two centreline definition points 38, 40 of the previously configured centreline 14, e.g., through superimposed consideration of the centreline definition points 38, 40 and the centreline 14, as shown in FIG. 5.

Optionally, when a deviation between the centreline layout or course and the centreline definition points exceeds a predefined threshold the visual docking guidance system is again configured/calibrated in step S5 to bring the visual docking guidance system back to a state for adequate operation.

The procedure described above with respect to FIG. 7 can be carried also manually, e.g., after an alarm from the system or automatically according to preset criteria.

Also, it should be noted that the predefined threshold is a freely selectable parameter for the centreline configuration according to the present invention. Further, to achieve a new configuration of the visual docking guidance system one may simply define new centreline definition points according to the new centreline identification picture for subsequent operation of the visual docking guidance system. Another, second way is to define a transformation mapping the position of the predefined centreline definition points to newly defined centreline definition points for subsequent coordinate transfer calculation during the operation of the visual docking guidance system.

Figure 8:
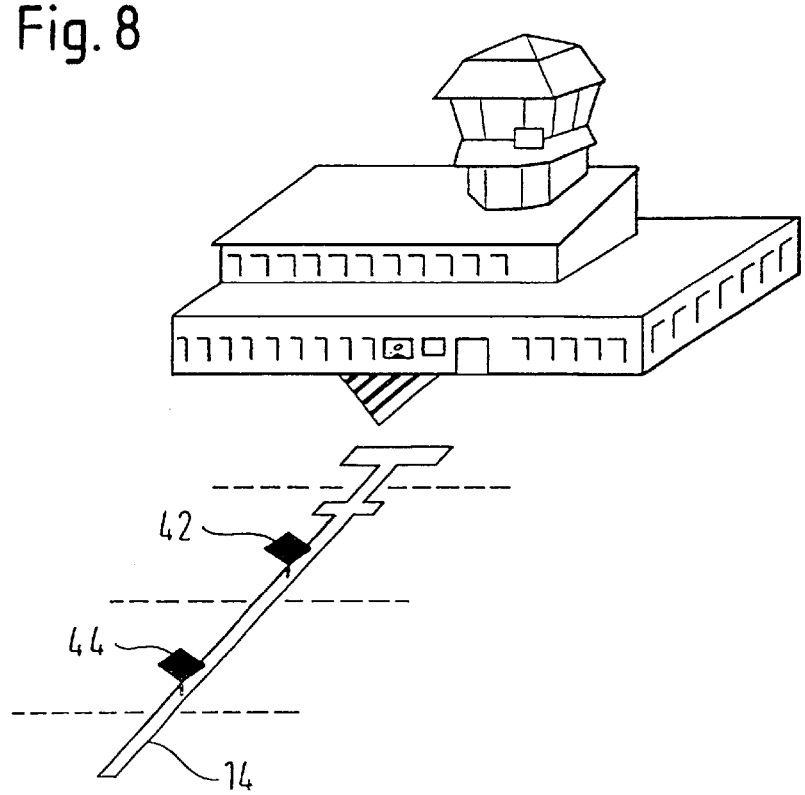
FIG. 8 shows a centerline identification picture with reflected intensity display together with a placement of reflecting objects on the centreline according to the present invention.
Figure 8:
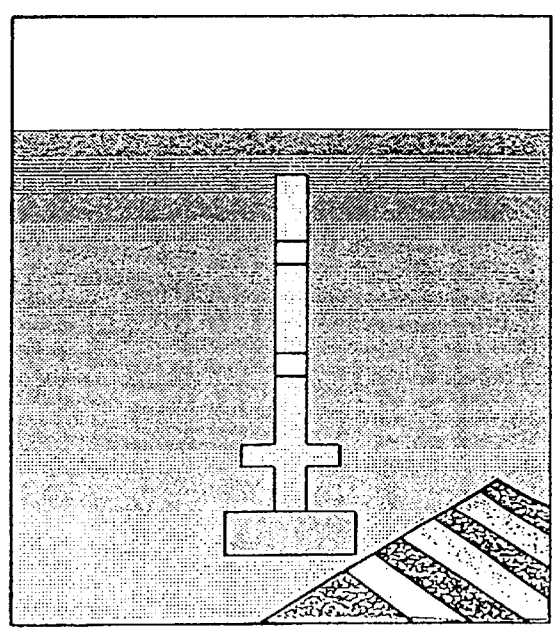

FIG. 8 shows a further modification of the present invention, where a centreline identification picture is generated with reflecting objects being placed on the centreline.

As shown in FIG. 8, according to a preferred embodiment of the present invention, it is proposed to place reflecting objects 42, 44 with increased reflectivity on the centreline 14 before scanning of the apron. Typical extensions of such reflecting objects could be up to 0.5 m width and up to 0.5 m height. This approach facilitates the configuration of a centreline under harsh measurement conditions, e.g., a worn centreline or a centreline covered by aircraft tire rubber. In any case, the provision of reflecting objects with increased reflectivity allows to achieve a correct and safe definition of centreline definition points on the centreline 14.

Figure 9:
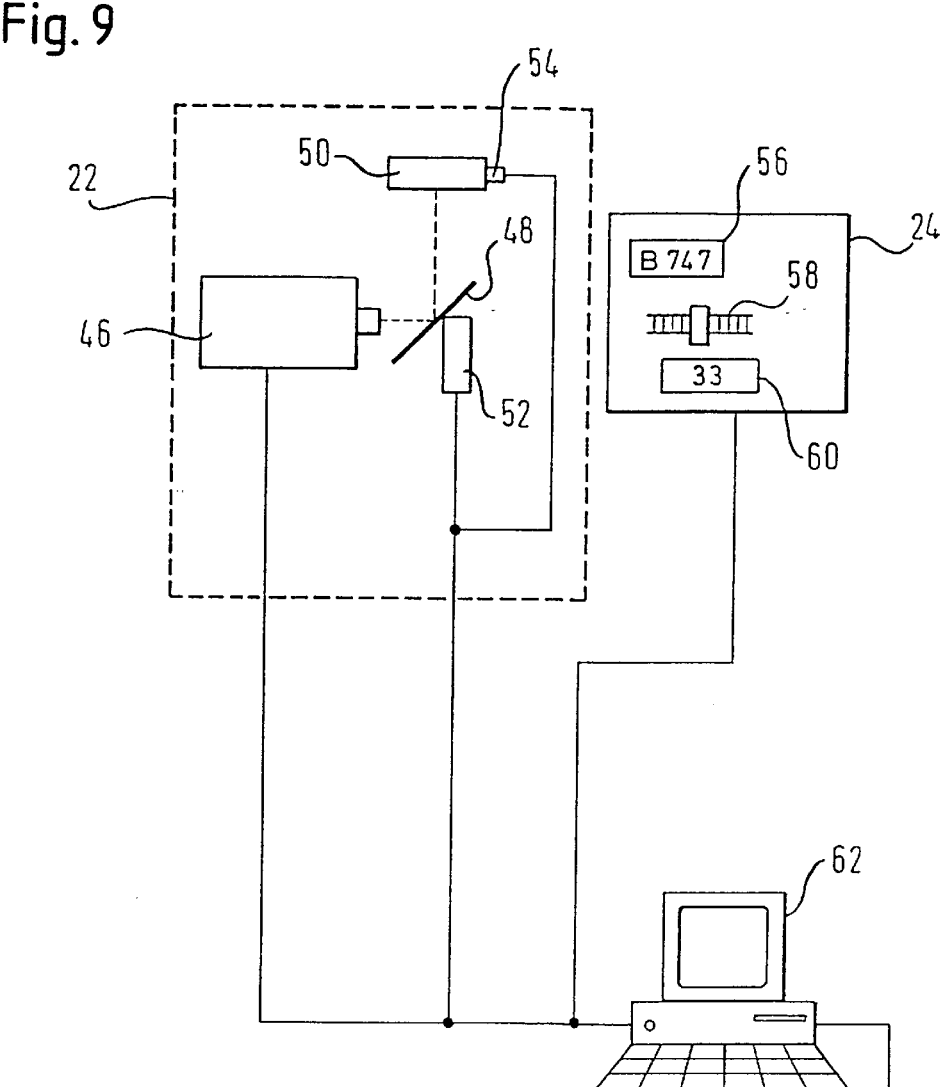
FIG. 9 shows a schematic diagram of a centreline configuration system according to the present invention.

FIG. 9 shows a schematic diagram of a centreline configuration system according to the present invention.

As shown in FIG. 9, the centreline configuration system divides into the visual docking guidance system with the tracking system 22 and the visual display 24 and a processing and control unit 62. The tracking system 22 comprises a beam range finder 46 generating, e.g., a laser beam being reflected by a first mirror 48 and a second mirror 50 for subsequent scanning of the apron. Each first and second mirror 48 and 50 is driven by a first and second step motor 52 and 54, respectively.

Further, the visual docking guidance system comprises the display unit 24 displaying the type of aircraft 56, the lateral deviation 58, and the distance to the stop position 60.

As shown in FIG. 9, both the tracking system 22 and the display unit 24 of the visual docking guidance system are operated under control of computer and/or a dedicated processor 62 having access to a storage medium 64 provided either internally or externally 64.

As shown in FIG. 9, the processing and control unit 62 is adapted to control the tracking unit 22 such that in a first scanning process of the apron, there are generated scan data 1 comprising both the horizontal and vertical angles $\alpha_i$, $\beta_i$ and related distances $d_i$ together with related intensity measurement values $I_i$. In addition, the stored medium also stores centreline definition points $\alpha_i$, $\beta_i$, $d_i$. This data is generated after the display of the centreline identification picture on the display screen of the control and processing unit 62, e.g., through actuation of an I/O device like a mouse, touch screen, touch pencil, etc., by the operator of the centreline configuration system.

As also shown in FIG. 9, subsequent to the first scan of the apron and a definition of related centreline definition points, a verification of such a centreline configuration requires a second or subsequent scan of the apron for generation of a new set of centreline identification picture-related data $\alpha'_i$, $\beta'_i$, $d'_i$, $I'_i$.

However, after a second scan of the apron, there is no repeated definition of centreline definition points, but the data with respect to the centreline definition points generated during the first scan of the apron is used for, e.g., superimposed display on the screen of the control and processing unit 62 for evaluation of a centreline definition point match or centreline definition mismatch as outlined with respect to FIG. 5.

While above the present invention has been explained with respect to what is considered the best mode and preferred embodiments thereof, it should be clear for those skilled in the art that many modifications and variations may be considered and are readily available.

E.g., while reference has been made to two centreline definition points above it should be clear that an arbitrary number of centreline definition points can be used for centreline configuration and/or calibration, whatever is appropriate to define a course of the centreline in three-dimensions.

Further, the present invention may either be implemented in sofware/hardware or a combination thereof, again on the basis of available general purpose components or dedicated hardware.

Still further, while reference has been made to a laser beam range finder it should be clear that any appropriate scanning technique well known in the art is well covered by the present invention, e.g., microwave, ultrasonic scanning, infrared scanning, etc.

Still further, while above the present invention has been explained with reference to a single centreline, it should be clear that the same techniques and features as outlined above may as well be applied to the configuration and/or calibration of a plurality of centrelines in front of an airport stand.

What is claimed is:

1. Method of centreline identification in a docking guidance system, comprising the steps:
    a) scanning (S1) an apron in front of a docking stand (16) with a range finder (22) and registering reflection intensity and position for each scanned point; and
    b) identifying (S2) a centreline (14) in front of the docking stand (16) by using differences in reflection intensity.

2. Method according to claim 1, characterized in that it further comprises the step defining (S3) at least two centreline definition points (38, 40) in compliance with the centreline layout.

3. Method according to claim 1, characterized in that it further comprises the step comparing (S4) pre-defined centreline definition points (38, 40) with the identified centreline (14).

4. Method according to claim 3, characterized in that it further comprises the step of re-configuring (S5) the docking guidance system when a deviation between the identified centreline and existing centreline definition points exceeds a pre-determined threshold.

5. Method according to claim 1, characterized in that the identification of a centreline (14) in front of the docking stand (16) is achieved using differences in reflection intensity between the centreline and the apron surface surrounding the centreline (14).

6. Method according to claim 1, characterized in that the identification of the centreline (14) is achieved automatically.

7. Method according to claim 1, characterized in that it further comprises the step of placing at least one reflecting object (42, 44) with high reflectivity on the centreline (14) before scanning the apron.

8. Method according to claim 7, characterized in that the reflecting object (42, 44) is a high reflective plate of up to 0.5 m width and up to 0.5 m height.

9. Method according to claim 4, characterized in that the step of re-configuring the docking guidance system comprises the step of re-defining at least two centreline definition points according to the identified centreline (14).

10. Centreline identification system for a docking guidance system, comprising:
    a) a scanning unit (22) adapted to scan an apron in front of a docking stand (16);
    b) a registration unit (64) adapted to register reflection intensity and position for each scanned point; and
    c) a processing unit (62) adapted to identify a centreline (14) in front of the docking stand (16) by using differences in reflection intensity.

11. System according to claim 10, characterized in that the processing unit (62) is further adapted to define at least two centreline definition points (38, 40) in compliance with the centreline layout.

12. System according to claim 10, characterized in that the processing unit (62) is further adapted to compare predefined centreline definition points (38, 40) with the identified centreline.

13. System according to claim 10, characterized in that the processing unit (62) is adapted to identify a centreline (14) in front of the docking stand using differences in reflection intensity between the centreline and the apron surface surrounding the centreline.

14. System according to claim 10, characterized in that the processing unit (62) is adapted to identify the centreline (14) in front of the docking stand automatically.

15. System according to claim 12, characterized in that the processing unit (62) is adapted to re-configure the docking guidance system when a deviation between the identified centreline and existing centreline definition points exceeds a pre-determined threshold.

16. System according to claim 15, characterized in that the processing unit (62) is adapted to re-configure the docking guidance system through re-definition of the at least two centreline definition points according to the identified centreline layout.

* * * * *